Jan. 16, 1945. E. D. DITTO 2,367,389
INDUSTRIAL GOGGLE
Filed April 29, 1943
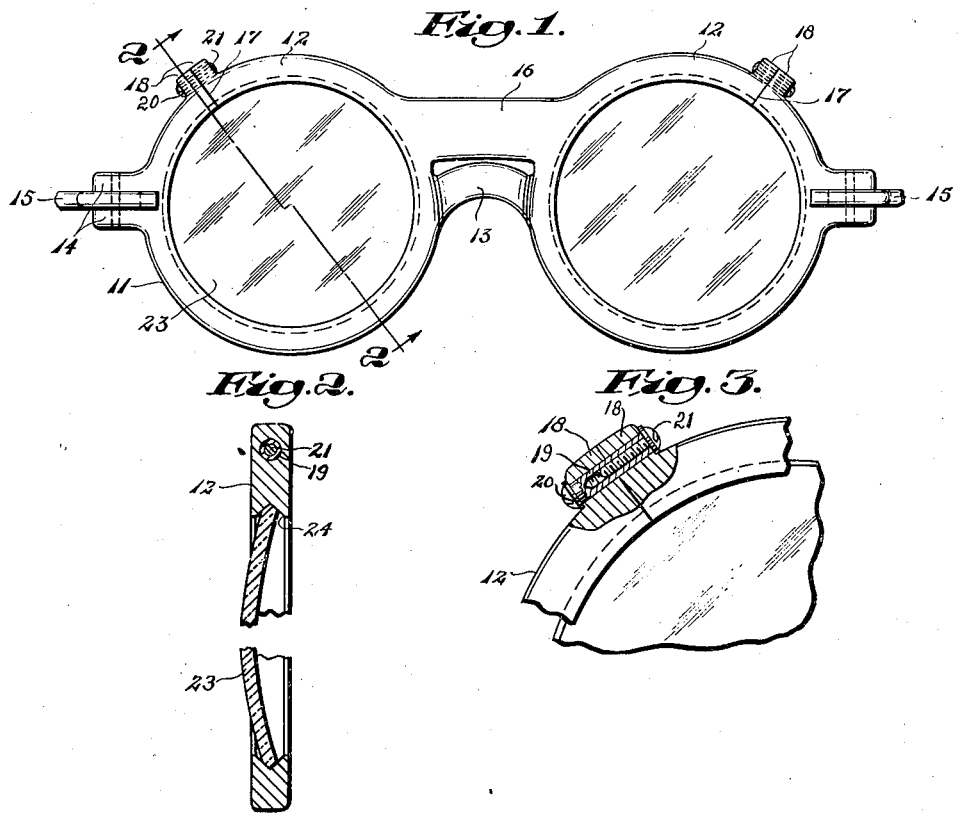
Inventor:
Eugene D. Ditto,
by Thomson & Thomson
Attorneys Patented Jan. 16, 1945

2,367,389

UNITED STATES PATENT OFFICE 2,367,389

INDUSTRIAL GOGGLES

Eugene D. Ditto, Brookline, Mass., assignor to Marine Optical Mfg. Co., Boston, Mass., a partnership composed of Arthur Ditto, Hugo M. Ditto, and Eugene D. Ditto Application April 29, 1943, Serial No. 484,975

1 Claim. (Cl. 88—47)

This invention relates to spectacle frames and pertains more particularly to improvements in industrial goggles which are desirably equipped with readily replaceable lenses; and the principal purpose of the invention is to provide a simple and economical plastic frame which is split at the respective eye pieces, remote from the temple hinge, and provided with durable, efficient and easily operable means for closing or opening the joint, so that the lenses may be tightly secured within the rims, yet removed and replaced with ease and without injury to the goggle frame.

Recommended embodiments of the invention are illustrated in the accompanying drawing, but it will be understood that the structural details of the goggles herein shown and described may be varied to suit particular purposes or conditions without departing from the essence of this invention as set forth in the appended claim. In the drawing, Fig. 1 is a front view of a pair of industrial goggles having separably connected eye pieces made in accordance with one form of the invention;

Fig. 2 is an enlarged, broken section on line 2—2 of Fig. 1; and

Fig. 3 is an enlarged fragmentary view, partly in section, showing the connecting elements of the frame joint.

The improved goggle comprises a frame 11 made of any suitable plastic material, stamped or molded in accordance with common practice to provide a pair of eye pieces 12 joined by a nose bridge 13 and having side lugs 14 between which the customary temple bows 15 are suitably hinged. An auxiliary bridge 16 may be provided to reinforce the frame and to protect the wearer from flying particles to which the defense or industrial worker is normally subjected.

Such flying metal particles or abraded dust pit and score the lenses of industrial goggles until they become blurred and require replacement. Frequent removal of the lenses is necessary on many types of machine work in war industries. The present improvement permits such removal and replacement without appreciable loss of time or inconvenience to the worker, and without impairing the efficiency and durability of the goggles.

To this end, each eye piece or rim 12 is split or divided at 17, preferably at the upper outside quadrant and remote from the temple hinges 14; and small bosses 18, integral with the frame, are provided on opposite sides of the split or division to receive the fastening elements 19 and 21.

The glass or plastic lenses 23 are retained in grooves 24 of the respective divided rims 12, so long as the fastening elements hold the bosses together, but may be quickly removed from the frame by loosening the fastenings and spreading the separable rims at the divided joints 17, to permit the insertion of new lenses. This operation requires a minimum of time and effort, and repetition of the operation will not interfere with the adjustment of the temple hinge or impair the efficiency of the separable fastening.

The separable fastenings or connectors comprise an elongate, internally threaded sleeve or bushing 19 having a slotted head 20; and a headed screw 21 threading into the bushing 19 which extends into complemental openings in both bosses. The slotted heads of the respective connecting members are larger than the openings of the bosses and are readily accessible, so that the separable frame joint may be easily closed or released by screw drivers or other implements; and no fins or other projections to prevent relative movement between the bushing 19 and the lugs 18, are necessary.

The separable joints of the frame rims may be fashioned by stamping or molding the bosses or protrusions integrally with the frame, drilling a hole through the bosses to receive the bushings or connectors, then splitting the rims by transverse cuts through the bosses, and finally fitting the connecting elements within the drilled openings of the divided lugs. The provision of the metal bushings or sleeves at the separable joints permits the rim-closing screws to be set up tightly, avoids wearing or stripping of the threads of a plastic socket, and ensures a firmly closed joint which will hold the lens in place under the impacts to which it may be subjected by flying metal objects. The location of the bosses or projections which provide anchorage for the rim-connecting elements may obviously be varied as desired, so long as the separable joint is sufficiently remote from the temple lugs to avoid displacement of the temples when a lens is changed; and other structural details of the goggle frames herein described may be modified in size or shape.

The improved frames suitably accommodate the application of removable side shields (not shown) of the type heretofore employed with metal frames which are separable at the temple lugs or hinges; such shields having a curved base or insert fitting between the lens and the rim and secured therebetween by tightening the retaining screw which holds the lens in place.

I claim:

In industrial goggles comprising a frame of plastic material having a pair of lens rims and temple hinges at the sides thereof, each rim being divided transversely at its upper and outer quadrant, and a lens removably retained in each rim, the rim having outwardly protruding bosses on opposite sides of said division and the respective bosses having complemental openings therethrough, closing means comprising an internally threaded bushing passing through one of said openings and extending into the other, and a screw entering said other opening and threading into said bushing to close the joint, said bushing and screw having screw heads accessible at the outer ends of said bosses and the diameter of said screw heads being greater than that of the openings in said bosses.

EUGENE D. DITTO.